US011954957B2

(12) United States Patent
Min

(10) Patent No.: US 11,954,957 B2
(45) Date of Patent: Apr. 9, 2024

(54) ELECTRONIC KEYS FOR ELECTRONIC LOCKS AND METHODS OF USING THE SAME

(71) Applicant: NANJING EASTHOUSE ELECTRICAL CO., LTD., Nanjing (CN)

(72) Inventor: Hao Min, Nanjing (CN)

(73) Assignee: NANJING EASTHOUSE ELECTRICAL CO., LTD., Nanjing (CN)

( * ) Notice: Subject to any disclaimer, the term of this patent is extended or adjusted under 35 U.S.C. 154(b) by 51 days.

(21) Appl. No.: 16/968,383

(22) PCT Filed: Aug. 5, 2020

(86) PCT No.: PCT/CN2020/107176

§ 371 (c)(1),
(2) Date: Aug. 7, 2020

(87) PCT Pub. No.: WO2022/027343

PCT Pub. Date: Feb. 10, 2022

(65) Prior Publication Data

US 2023/0154258 A1 May 18, 2023

(51) Int. Cl.
*G07C 9/00* (2020.01)

(52) U.S. Cl.
CPC ..... *G07C 9/00658* (2013.01); *G07C 9/00309* (2013.01); *G07C 9/00944* (2013.01); *G07C 2009/00587* (2013.01); *G07C 2009/00603* (2013.01); *G07C 2009/00634* (2013.01); *G07C 2009/00761* (2013.01); *G07C 9/00912* (2013.01); *G07C 2009/00984* (2013.01)

(58) Field of Classification Search
None
See application file for complete search history.

(56) References Cited

U.S. PATENT DOCUMENTS

| | | | | |
|---|---|---|---|---|
| 10,395,455 B2 * | 8/2019 | Murar | G07C 9/28 | |
| 11,399,287 B2 * | 7/2022 | Soryal | H04W 4/40 | |
| 2017/0236346 A1 * | 8/2017 | Murar | G07C 9/00309 | 340/5.61 |
| 2022/0322095 A1 * | 10/2022 | Soryal | G07C 9/00309 | |
| 2023/0169806 A1 * | 6/2023 | Min | G07C 9/00182 | 380/44 |

* cited by examiner

*Primary Examiner* — Carlos Garcia
(74) *Attorney, Agent, or Firm* — Ming Jiang; MM IP SERVICE LLC

(57) ABSTRACT

The present disclosure relates a set of electronic keys for an electronic lock. The set of electronic keys includes at least one passive electronic key having a passive digital key, and at least one active electronic key having an active digital key. Each of passive and active electronic keys includes a communication channel and an electronic key power supply port. The active electronic key includes electrical power source providing electrical power supply to the active electronic key itself, the electronic lock and the passive electronic key through the electronic lock to operate the electronic lock. When both active and passive electronic keys are inserted into respective electronic keyholes of the electronic lock, both active and passive digital keys are transmitted to the electronic lock, the electronic lock can be locked and unlocked only when both active and passive digital keys received match prestored active and passive digital keys respectively.

20 Claims, 9 Drawing Sheets

10

ELECTRONIC KEYS FOR ELECTRONIC LOCKS AND METHODS OF USING THE SAME

FIELD

The present disclosure generally relates to electronic lock system, and more particularly to electronic keys for electronic locks, and methods of using the electronic keys.

BACKGROUND

Safe deposit box is a secure container usually made of metal that's used to store valuables at a bank or credit union. These boxes are often kept in vaults and can be rented throughout the lifetime of a customer for an annual fee. Usually, opening the safe deposit box requires at least two keys, one for a bank management staff, and the other one for the customer. Both keys are required to open the safe deposit box. Currently, most banks still use mechanical safe deposit boxes with a set of keys. These mechanical lock's keys are easy to duplicate and the safety of the contents in the safe deposit box is not guaranteed. It is desirable to have electronic locks with electronic keys that people are unable to duplicate.

Therefore, heretofore unaddressed needs still exist in the art to address the aforementioned deficiencies and inadequacies.

SUMMARY

In one aspect, present disclosure relates to a set of electronic keys for an electronic lock. In certain embodiments, the set of electronic keys includes at least one passive electronic key, and at least one active electronic key. Each of the passive electronic key and the active electronic key includes two or more electronic key contacts. The active electronic key further includes an electrical power source. In certain embodiments, the electrical power source provides electrical power supply to the active electronic key itself, the electronic lock and the passive electronic key through the electronic lock to operate the electronic lock.

In certain embodiments, each of the set of electronic keys includes: an electronic key processor, and a non-volatile memory. The non-volatile memory stores an operating system and computer executable instructions. The computer executable instructions include: a digital key storage module, a digital key control module, a digital key encryption/decryption module, and an electrical power module.

In certain embodiments, during an activation process of the electronic lock, a first user triggers an electronic lock activation mechanism, a digital key control module of the electronic lock sends an activation instruction to the active electronic key and the passive electronic key through an active communication channel and a passive communication channel respectively, the activation instruction instructs the digital key control module of the active electronic key to generate an active digital key for the active electronic key and the digital key control module of the passive electronic key to generate a passive digital key for the passive electronic key, the active digital key generated is stored in a digital key storage module of the active electronic key, the passive digital key generated is stored in a digital key storage module of the passive electronic key, the active digital key generated is encrypted by a digital key en/decryption module of the active electronic key and transmitted to the electronic lock digital key storage module as a prestored active digital key, the passive digital key generated is encrypted by a digital key en/decryption module of the passive electronic key and transmitted to the electronic lock digital key storage module as a prestored passive digital key, and the prestored active digital key and the prestored passive digital key are used for authentication of the set of electronic keys.

In certain embodiments, the digital key storage module of the active electronic key receives and stores the active digital key from the digital key control module of the active electronic key. The digital key storage module of the passive electronic key receives and stores the passive digital key from the digital key control module of the passive electronic key.

In certain embodiments, the digital key encryption/decryption module of the active electronic key encrypts the active digital key before transmitting out. The digital key encryption/decryption module of the passive electronic key encrypts the passive digital key before transmitting out.

In certain embodiments, the electrical power module of the active electronic key receives electrical power supply from the electrical power source and provides electrical power supply to the electronic lock, and the electrical power module of the passive electronic key receives electrical power supply from the active electronic key through the electronic lock.

In certain embodiments, when executed by the electronic key processor, the computer executable instructions cause the electronic key processor to perform one or more of operations:

- providing, via the electrical power module of the active electronic key, electrical power supply through an active electronic key power supply port to the electronic lock, and providing the active digital key to the electronic lock through an active communication channel of the active electronic key, when the first user inserts the active electronic key into an active electronic keyhole of the electronic lock;
- providing, via the electrical power module of the active electronic key, electrical power supply to the passive electronic key through a passive electronic key power supply port from the electronic lock, and providing the passive digital key to the electronic lock through a passive communication channel of the passive electronic key, when the active electronic key is inserted in the active electronic keyhole of the electronic lock, and a second user inserts the passive electronic key into a passive electronic keyhole of the electronic lock;
- instructing, by the digital key control module of the active electronic key through the active communication channel of the active electronic key, the electronic lock to compare the active digital key received and the passive digital key received with a prestored active digital key and a prestored passive digital key in the digital key storage module of the electronic lock; and
- operating, by an electronic lock control module of the electronic lock, an electronic lock tongue through an electronic locking mechanism to lock and unlock the electronic lock, when a digital key authentication module of the electronic lock determines that the active digital key received and the passive digital key received are the same as a prestored active digital key and a prestored passive digital key respectively,
- operating, by the digital key control module of the active electronic key through the active communication channel of the active electronic key, the electronic lock to operate an electronic lock tongue of the electronic lock through an electronic lock control module and an electronic locking mechanism to lock and unlock the electronic lock, when a digital key authentication module of the electronic lock determines that the prestored active digital key and the prestored passive digital key match the active digital key received and the passive digital key received respectively.

In certain embodiments, the electronic lock includes two or more electronic keyholes. These electronic keyholes include at least the active electronic keyhole and at least the passive electronic keyhole. The active electronic keyhole includes at least two active electronic keyhole contacts and the active electronic keyhole receives the active electronic key. The passive electronic keyhole includes at least two passive electronic keyhole contacts and the passive electronic keyhole receives the passive electronic key.

In certain embodiments, the first user is a management staff of the electronic lock and uses the active electronic key. The second user is a customer and uses the passive electronic key. The electronic lock is to be locked and unlocked only when the first user and the second user are both present and use their own respective electronic keys simultaneously.

In certain embodiments, the electronic lock includes at least two communication channels. The communication channels includes at least the active communication channel for transmitting the active digital key between the active electronic key and the electronic lock and transmitting active digital key control instructions to the electronic lock, and at least the passive communication channel for transmitting the passive digital key between the passive electronic key and the electronic lock.

In certain embodiments, the electronic lock includes at least two electronic key power supply ports. The electronic key power supply ports includes at least the active electronic key power supply port for receiving electrical power supply from the active electronic key, and at least the passive electronic key power supply port for providing electrical power supply to the passive electronic key from the active electronic key through the electronic lock.

In certain embodiments, the electrical power source includes at least one of a battery and a rechargeable battery. The rechargeable battery includes at least one of: a lead-acid rechargeable battery, a nickel cadmium (NiCd) rechargeable battery, a nickel metal hydride (NiMH) rechargeable battery, a lithium ion (Li-ion) rechargeable battery, and a lithium ion polymer (Li-ion polymer) rechargeable battery. In certain embodiments, the active electronic key includes an active electronic key charging port, and the active electronic key charging port is used to charge the rechargeable battery.

In another aspect, the present disclosure relates to a method of using a set of electronic keys to operate an electronic lock. In certain embodiments, the method includes:

- inserting, by a first user, an active electronic key into an active electronic keyhole of the electronic lock, wherein the active electronic key comprises an electrical power source to provide electrical power supply to the electronic lock through an active electronic key power supply port of the active electronic key, and an active digital key to the electronic lock through an active communication channel of the active electronic key;
- inserting, by a second user while the active electronic key is inserted in the active electronic keyhole of the electronic lock, a passive electronic key into a passive electronic keyhole of the electronic lock to receive electrical power supply from the electronic lock through an electrical power module of the passive electronic key and a passive electronic key power supply port from the electronic lock, and to provide a passive digital key to the electronic lock through a passive communication channel of the passive electronic key;
- instructing, by the digital key control module of the active electronic key through the active communication channel of the active electronic key, the electronic lock to compare the active digital key received and the passive digital key received with a prestored active digital key and a prestored passive digital key in the digital key storage module of the electronic lock; and
- operating, by an electronic lock control module of the electronic lock, an electronic lock tongue through an electronic locking mechanism to lock and unlock the electronic lock, when a digital key authentication module of the electronic lock determines that the active digital key received and the passive digital key received are the same as a prestored active digital key and a prestored passive digital key respectively.

In certain embodiments, each of the set of electronic keys includes: an electronic key processor, and a non-volatile memory. The non-volatile memory stores an operating system and computer executable instructions. The computer executable instructions include: a digital key storage module, the digital key control module, a digital key encryption/decryption module, and the electrical power module.

In certain embodiments, during an activation process of the electronic lock, a first user triggers an electronic lock activation mechanism, a digital key control module of the electronic lock sends an activation instruction to the active electronic key and the passive electronic key through an active communication channel and a passive communication channel respectively. The activation instruction instructs the digital key control module of the active electronic key to generate an active digital key for the active electronic key and the digital key control module of the passive electronic key to generate a passive digital key for the passive electronic key. The active digital key generated is stored in a digital key storage module of the active electronic key, and the passive digital key generated is stored in a digital key storage module of the passive electronic key. The active digital key generated is encrypted by a digital key en/decryption module of the active electronic key and transmitted to the electronic lock digital key storage module as a prestored active digital key, and the passive digital key generated is encrypted by a digital key en/decryption module of the passive electronic key and transmitted to the electronic lock digital key storage module as a prestored passive digital key. The prestored active digital key and the prestored passive digital key are used for authentication of the set of electronic keys.

In certain embodiments, the digital key storage module of the active electronic key receives and stores the active digital key from the digital key control module of the active electronic key. The digital key storage module of the passive electronic key receives and stores the passive digital key from the digital key control module of the passive electronic key.

In certain embodiments, the digital key encryption/decryption module of the active electronic key encrypts the active digital key before transmitting out. The digital key encryption/decryption module of the passive electronic key encrypts the passive digital key before transmitting out.

In certain embodiments, the electrical power module of the active electronic key receives electrical power supply from the electrical power source and provides electrical power supply to the electronic lock, and the electrical power module of the passive electronic key receives electrical power supply from the active electronic key through the electronic lock.

In certain embodiments, the first user is a management staff of the electronic lock and uses the active electronic key. The second user is a customer and uses the passive electronic key. The electronic lock is to be locked and unlocked only when the first user and the second user are both present and use their own respective electronic keys simultaneously.

In certain embodiments, the electronic lock includes two or more electronic keyholes. These electronic keyholes include at least the active electronic keyhole and at least the passive electronic keyhole. The active electronic keyhole includes at least two active electronic keyhole contacts and the active electronic keyhole receives the active electronic key. The passive electronic keyhole includes at least two passive electronic keyhole contacts and the passive electronic keyhole receives the passive electronic key.

In certain embodiments, the electronic lock includes at least two communication channels. The communication channels includes at least the active communication channel for transmitting the active digital key between the active electronic key and the electronic lock and transmitting active digital key control instructions to the electronic lock, and at least the passive communication channel for transmitting the passive digital key between the passive electronic key and the electronic lock.

In certain embodiments, the electronic lock includes at least two electronic key power supply ports. The electronic key power supply ports includes at least the active electronic key power supply port for receiving electrical power supply from the active electronic key, and at least the passive electronic key power supply port for providing electrical power supply to the passive electronic key from the active electronic key through the electronic lock.

In certain embodiments, the electrical power source includes at least one of a battery and a rechargeable battery. The rechargeable battery includes at least one of: a lead-acid rechargeable battery, a nickel cadmium (NiCd) rechargeable battery, a nickel metal hydride (NiMH) rechargeable battery, a lithium ion (Li-ion) rechargeable battery, and a lithium ion polymer (Li-ion polymer) rechargeable battery. In certain embodiments, the active electronic key includes an active electronic key charging port, and the active electronic key charging port is used to charge the rechargeable battery.

These and other aspects of the present disclosure will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the present disclosure, and features and benefits thereof, and together with the written description, serve to explain the principles of the present invention. Wherever possible, the same reference numbers are used throughout the drawings to refer to the same or like elements of an embodiment, and wherein.

DETAILED DESCRIPTION

Figure 1:
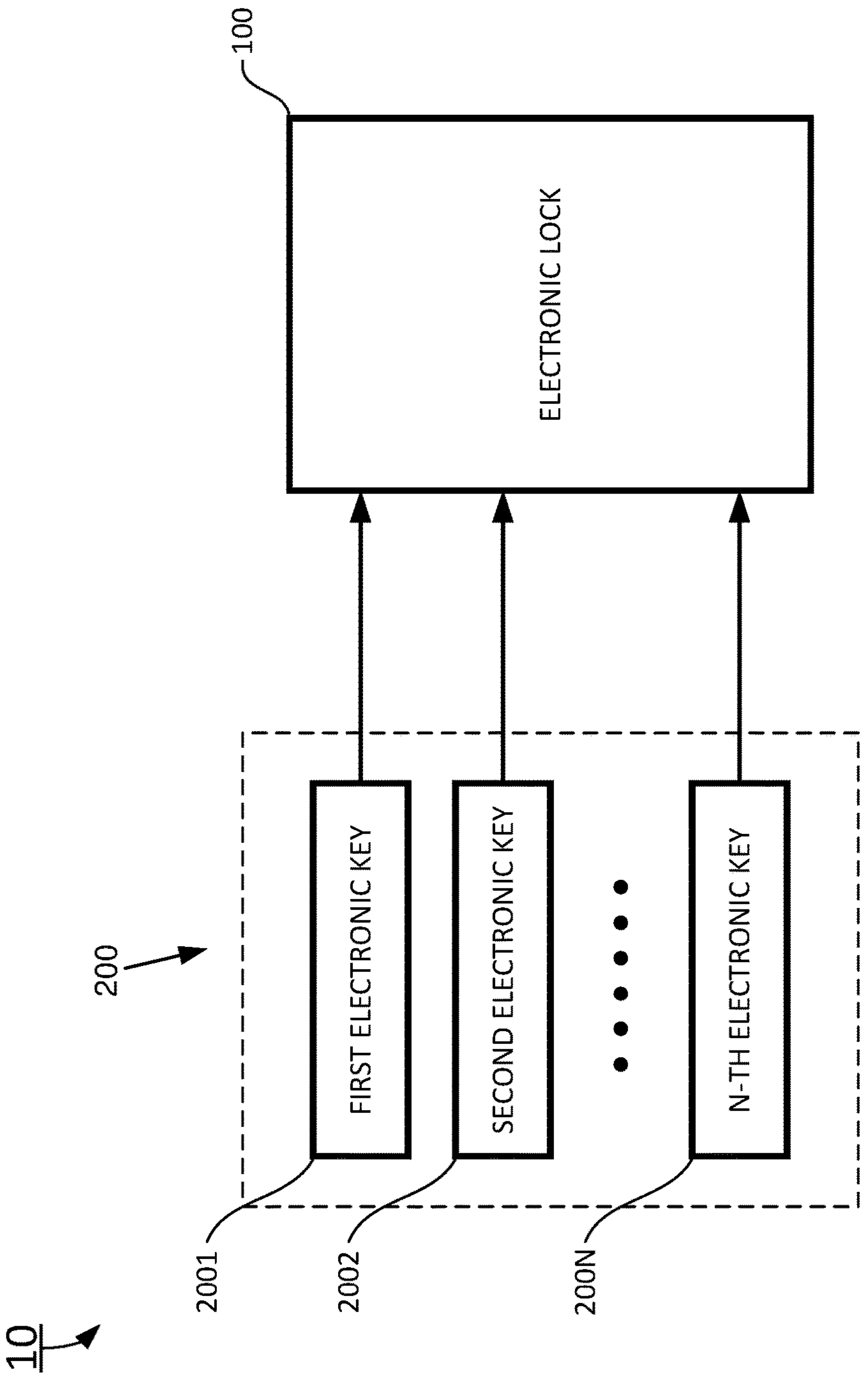
FIG. 1 is a block diagram illustrating an electronic locking system having an electronic lock and a set of electronic keys according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of “a”, “an”, and “the” includes plural reference unless the context clearly dictates otherwise. Also, as used in the description herein and throughout the claims that follow, the meaning of “in” includes “in” and “on” unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

Figure 5:
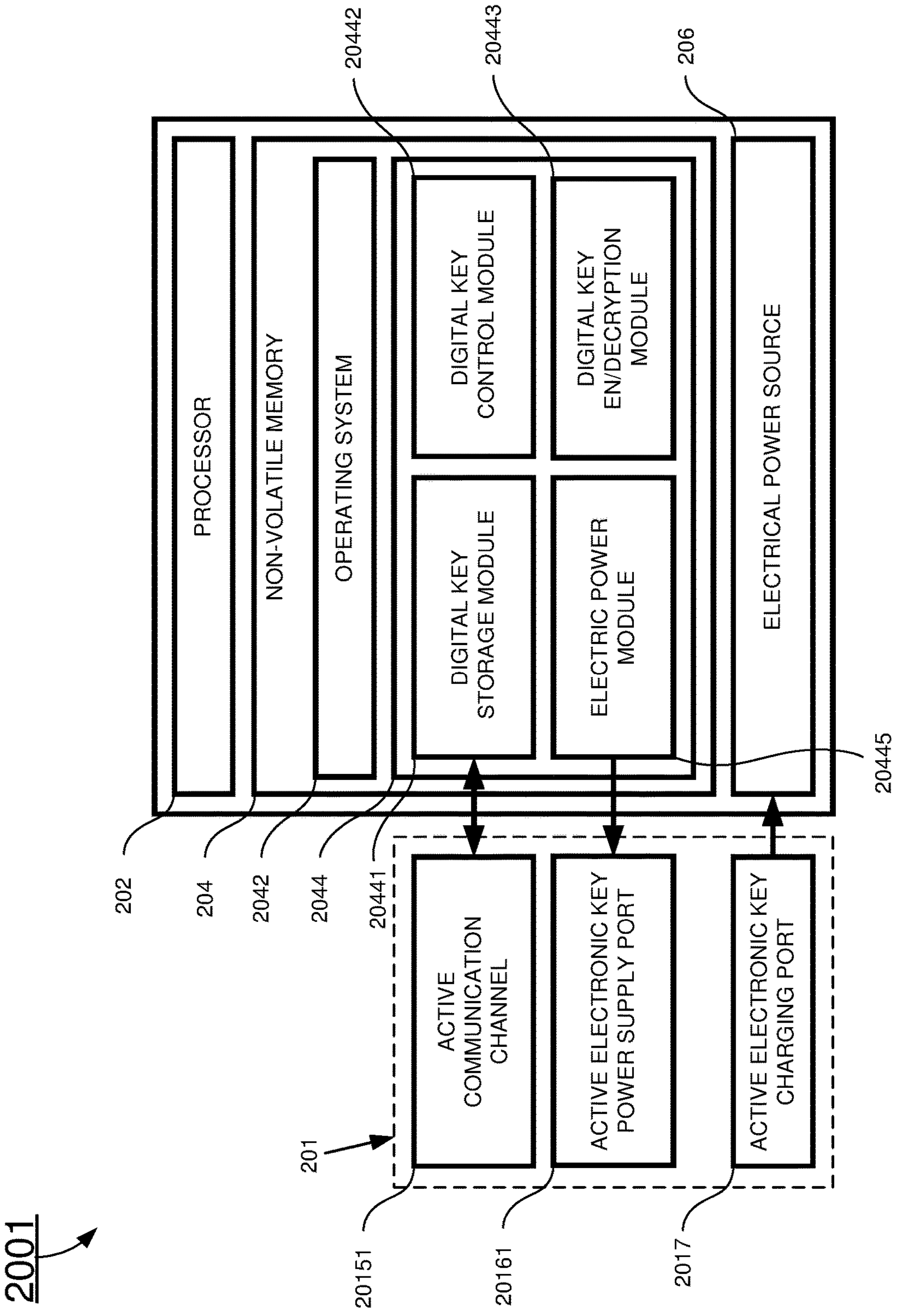
FIG. 5 is a block diagram of an exemplary active electronic key according to certain embodiments of the present disclosure.
Figure 6:
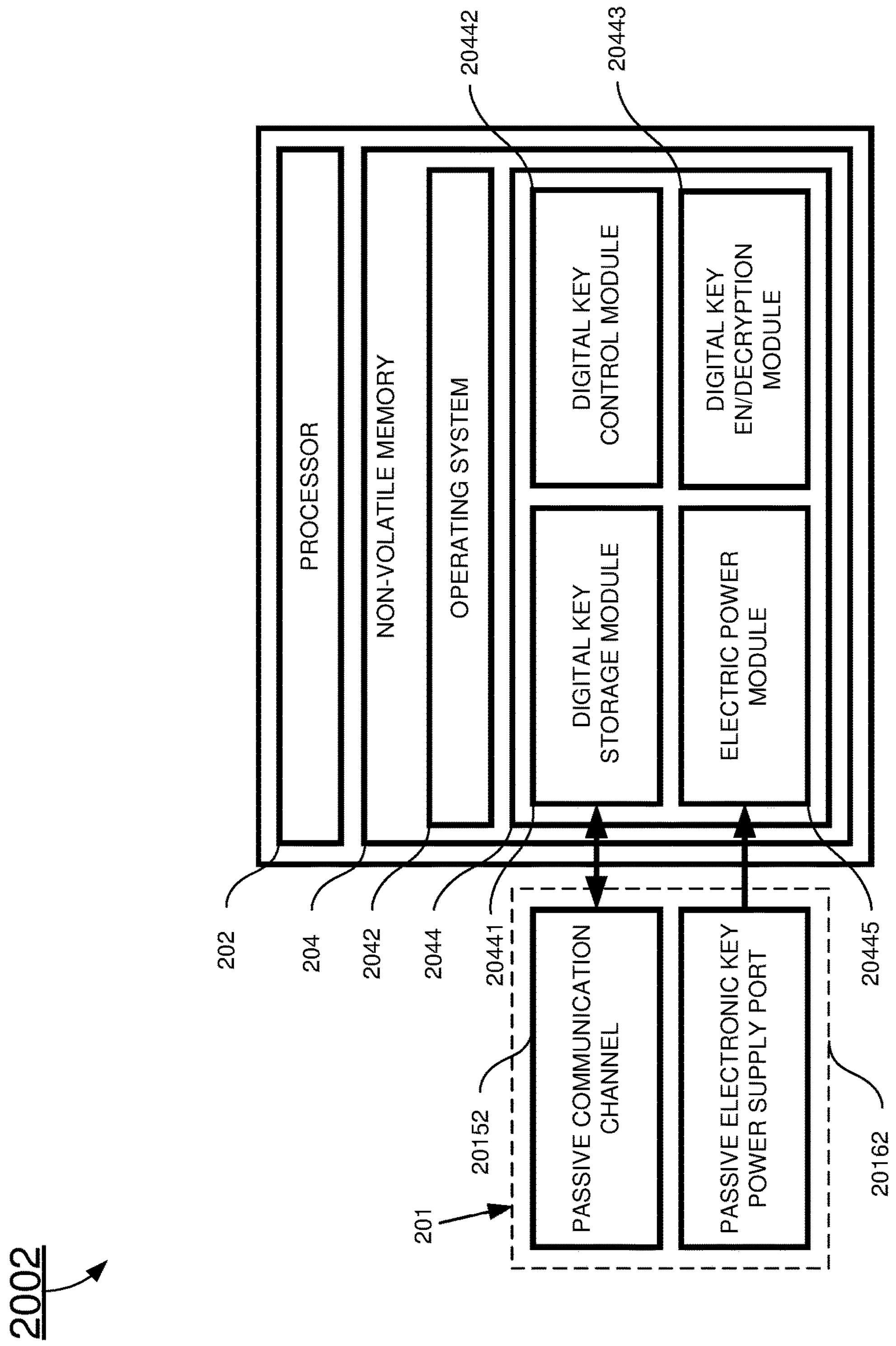
FIG. 6 is a block diagram of an exemplary passive electronic key according to certain embodiments of the present disclosure.

As used herein, the term electronic key is defined as a physical key to electronically operate an electronic lock. The electronic key may include electronic circuit, electronic modules, processor, memory, as well many other electronic components. The electronic key may include active electronic key and passive electronic key. The active electronic key includes electrical power source, as shown in FIG. 5 and the passive electronic key does not have electrical power source, as shown in FIG. 6.

As used herein, the term digital key is defined as a digital code stored in the physical electronic key to electronically operate the electronic lock. The active electronic key may store an active digital key, and the passive electronic key may store a passive digital key. In order to increase security of the electronic lock, these digital keys may be encrypted during the transmission of the digital keys between the electronic keys and the electronic lock.

As used herein, the phrase at least one of A, B, and C should be construed to mean a logical (A or B or C), using a non-exclusive logical OR. It should be understood that one or more steps within a method may be executed in different order (or conconventionally) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Figure 2:
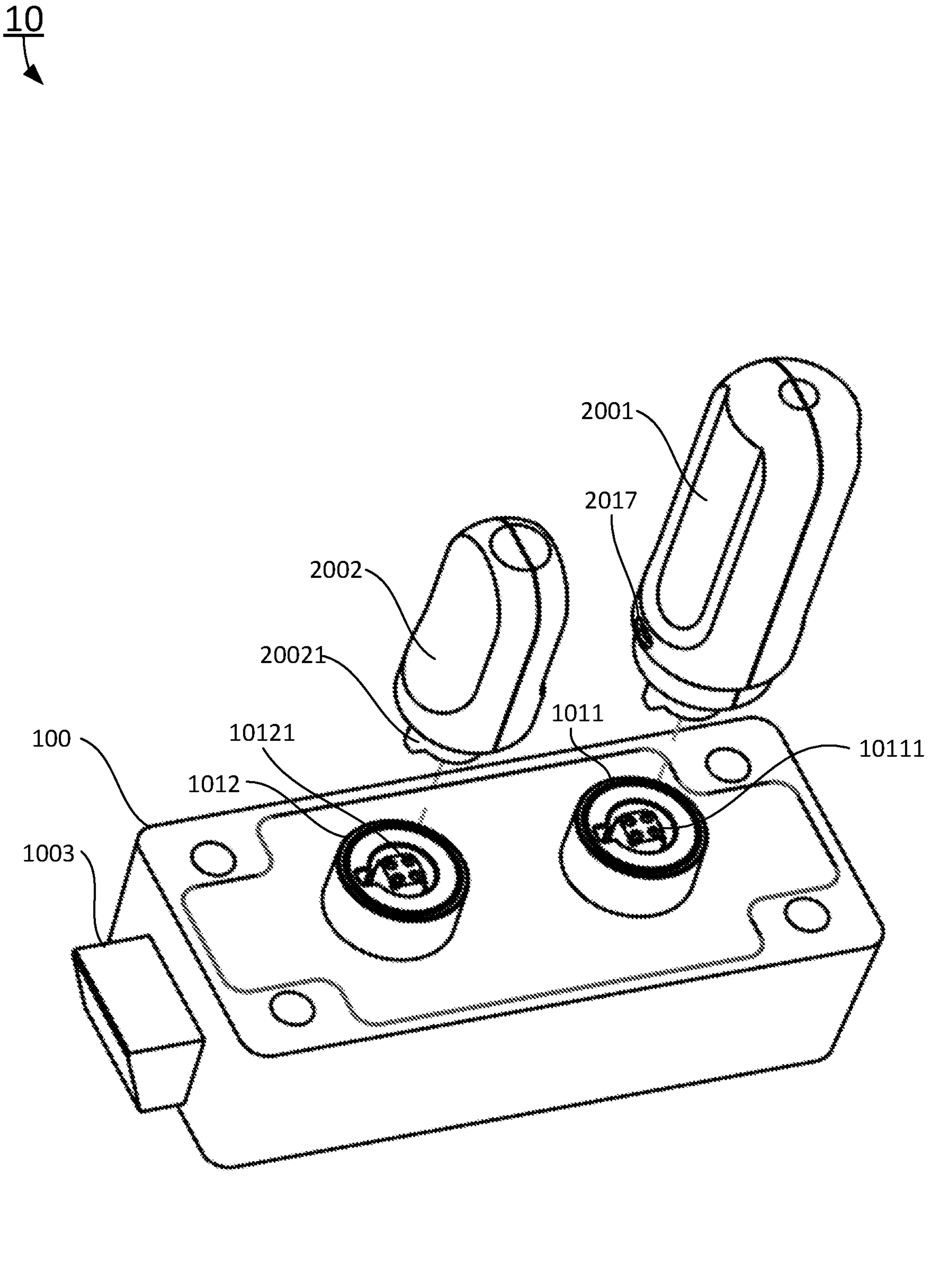
FIG. 2 is a perspective view of the electronic locking system having the electronic lock and the set of electronic keys when the set of electronic keys are not inserted into keyholes of the electronic lock according to certain embodiments of the present disclosure.
Figure 3:
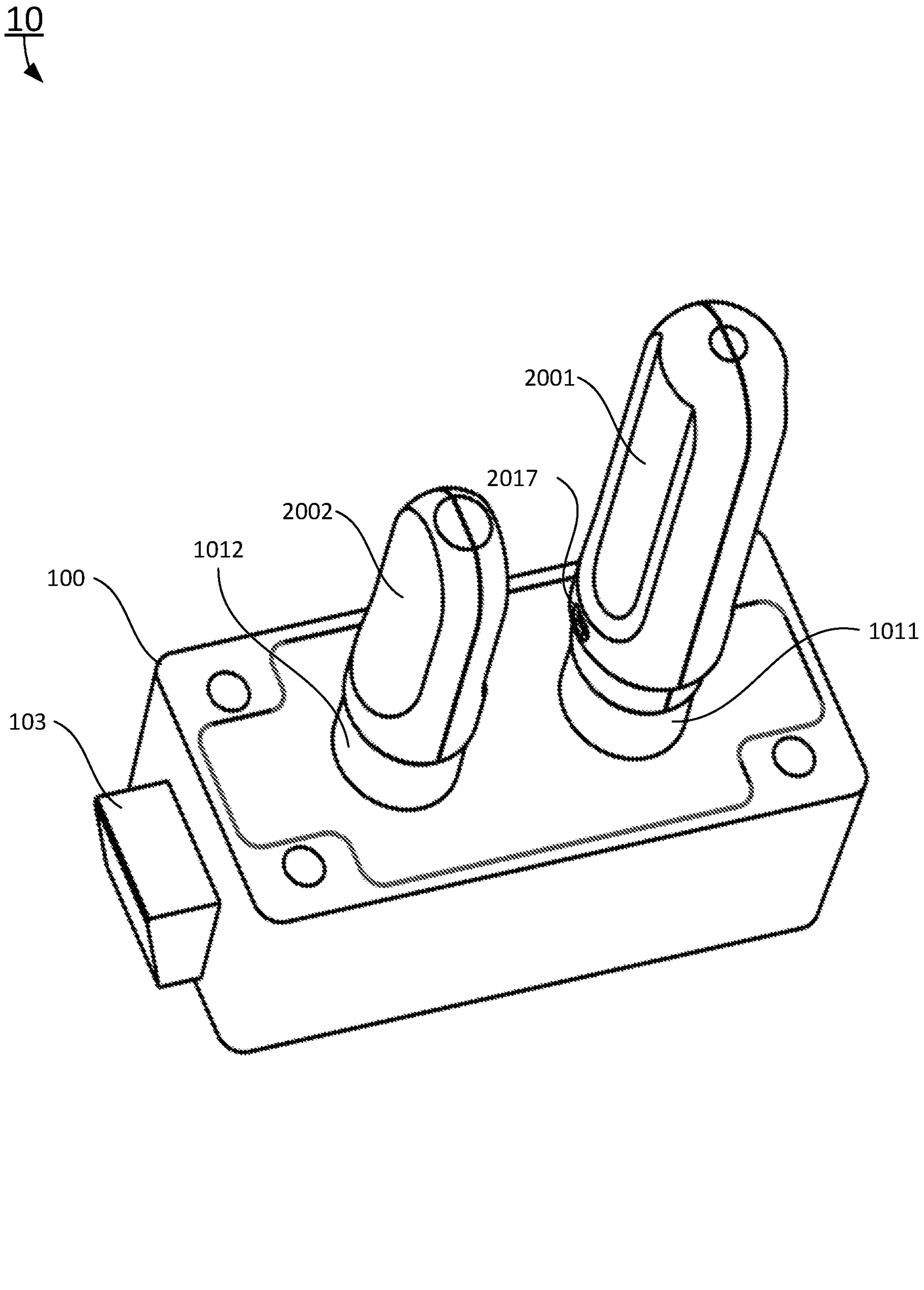
FIG. 3 is a perspective view of the electronic locking system having the electronic lock and the set of electronic keys when the set of electronic keys are inserted into keyholes of the electronic lock according to certain embodiments of the present disclosure.

Referring now to FIGS. 1-3, an electronic locking system 10 is shown according to certain embodiments of the present disclosure. The electronic locking system 10 includes an electronic lock 100, and a set of electronic keys 200. In this embodiment, the set of electronic keys 200 includes N electronic keys: a first electronic key 2001, a second electronic key 2002, . . . , and an N-th electronic key 200N. When the electronic lock 100 is equipped with N keyholes, then all N electronic keys are required to lock and unlock the electronic lock 100. In one embodiment, as shown in FIG. 2, the electronic locking system 10 includes the electronic lock 100, and two electronic keys: an active electronic key 2001 and a passive electronic key 2002. In this case, both active electronic key 2001 and passive electronic key 2002 are required to lock and unlock the electronic lock 100, as shown in FIG. 3.

In one aspect, present disclosure relates to the set of electronic keys 200 for the electronic lock 100. In certain embodiments, the set of electronic keys 200 includes at least one passive electronic key 2002, and at least one active electronic key 2001, as shown in FIG. 2 and FIG. 3. The active electronic key 2001 further includes an electrical power source 206. In certain embodiments, the electrical power source 206 provides electrical power supply to the active electronic key 2001 itself, to the electronic lock 100, and to the passive electronic key 2002 through the electronic lock 100 to operate the electronic lock 100.

Figure 4:
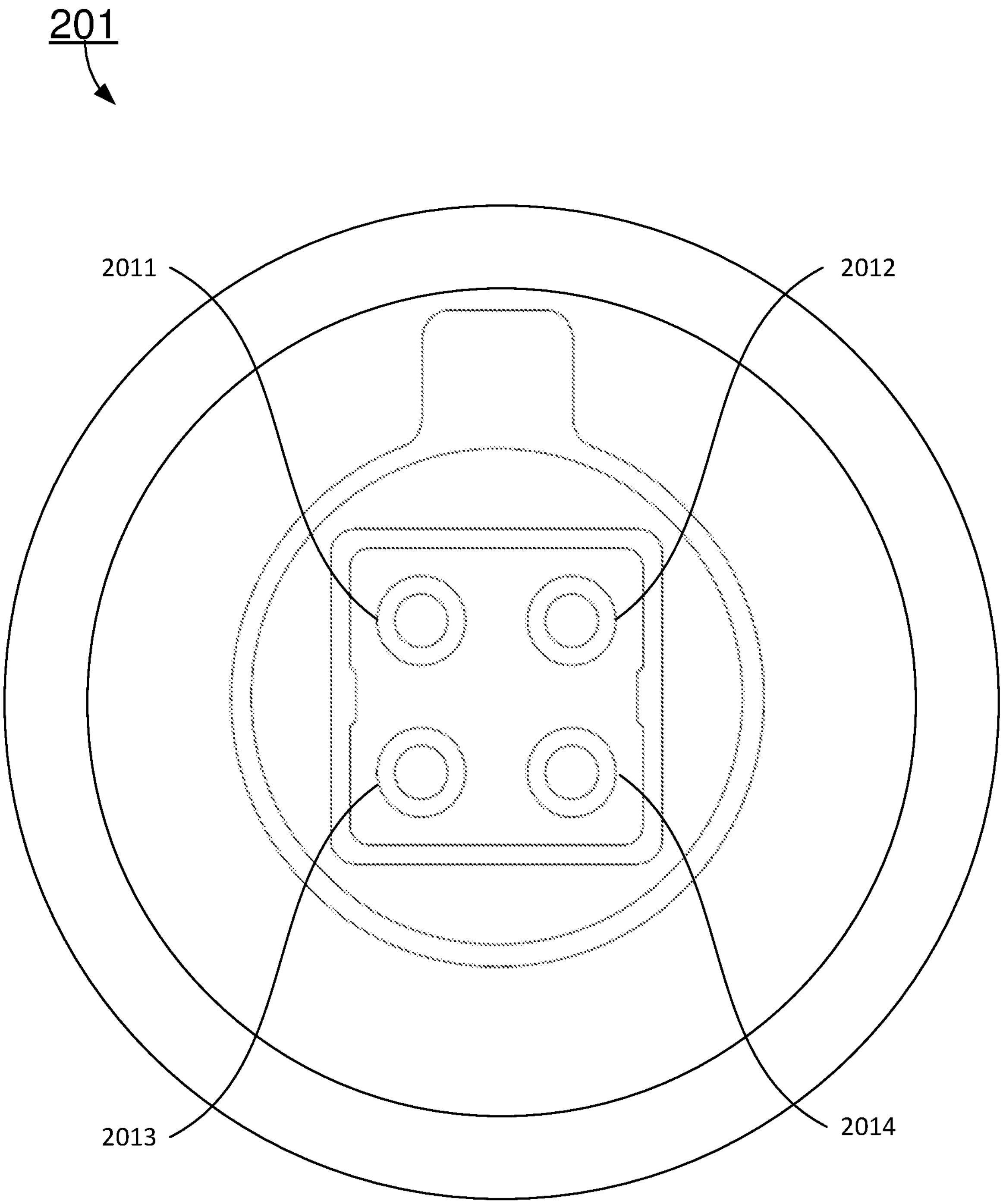
FIG. 4 shows a set of electronic key contacts of an exemplary electronic key according to certain embodiments of the present disclosure.

Each of the passive electronic key 2002 and the active electronic key 2001 includes two or more electronic key contacts 201. These electronic key contacts 201 are used to provide electrical power supply and transmit digital key between the electronic keys 200 to and from the electronic lock 100. In certain embodiments, the electronic key contacts 201 include at least two electronic key contacts. For an electronic key having three electronic key contacts, one electronic key contact may be used as positive power supply, one electronic key contact may be used as ground, and one electronic key contact may be used as communication channel. In one embodiment, as shown in FIG. 4, the electronic key contacts 201 include four contacts: an electronic key first contact 2011, an electronic key second contact 2012, an electronic key third contact 2013, and an electronic key fourth contact 2014. In this embodiment, the electronic key first contact 2011 and the electronic key second contact 2012 may be used for electrical power supply, and the electronic key third contact 2013 and the electronic key fourth contact 2014 may be used as communication channel. Additional electronic key contacts may be included to add other functionalities.

In certain embodiments, as shown in FIG. 5 and FIG. 6, each of the set of electronic keys 200 includes: an electronic key processor 202, and a non-volatile memory 204. The non-volatile memory 204 stores an operating system 2042 and computer executable instructions 2044. The computer executable instructions 2044 include: a digital key storage module 20441, a digital key control module 20442, a digital key encryption/decryption module 20443, and an electrical power module 20445.

In certain embodiments, during an activation process of the electronic lock 100, a first user triggers an electronic lock activation mechanism 108, a digital key control module 10442 of the electronic lock sends an activation instruction to the active electronic key 2001 and the passive electronic key 2002 through an active communication channel 20151 and a passive communication channel 20152 respectively, the activation instruction instructs the digital key control module 20442 of the active electronic key 2001 to generate an active digital key for the active electronic key 2001 and the digital key control module 20442 of the passive electronic key 2002 to generate a passive digital key for the passive electronic key 2002, the active digital key generated is stored in a digital key storage module 20441 of the active electronic key 2001, the passive digital key generated is stored in a digital key storage module 20441 of the passive electronic key 2002, the active digital key generated is encrypted by a digital key en/decryption module 20443 of the active electronic key 2001 and transmitted to the electronic lock digital key storage module 10441 as a prestored active digital key, the passive digital key generated is encrypted by a digital key en/decryption module 20443 of the passive electronic key 2002 and transmitted to the electronic lock digital key storage module 10441 as a prestored passive digital key, and the prestored active digital key and the prestored passive digital key are used for authentication of the set of electronic keys 200.

In certain embodiments, the digital key storage module 20441 of the active electronic key 2001 receives and stores the active digital key from the digital key control module 20442 of the active electronic key 2001. The digital key storage module 20441 of the passive electronic key 2002 receives and stores the passive digital key from the digital key control module 20442 of the passive electronic key 2002.

In certain embodiments, the digital key encryption/decryption module 20443 of the active electronic key 2001 encrypts the active digital key before transmitting out. The digital key encryption/decryption module 20443 of the passive electronic key 2002 encrypts the passive digital key before transmitting out. In certain embodiments, encryption algorithms may include Triple Data Encryption Standard (DES) algorithm, Rivest-Shamir-Adleman (RSA) algorithm, Blowfish algorithm, Twofish algorithm, and Advanced Encryption Standard (AES) algorithm. One to three private keys may be used for these encryption algorithms and the length of each private key ranges from 56 bits to 256 bits. In certain embodiments, the electrical power module 20445 of the active electronic key 2001 receives electrical power supply from the electrical power source 206 and provides electrical power supply to the electronic lock 100, and the electrical power module 20445 of the passive electronic key 2002 receives electrical power supply from the active electronic key 2001 through the electronic lock 100. In this way, the electronic lock 100 will not be locked and unlocked without the active electronic key 2001 because the active electronic key 2001 provides electrical power supply to all electronic keys 200 and the electronic lock 100.

In certain embodiments, when executed by the electronic key processor 202, the computer executable instructions 2044 cause the electronic key processor 202 to perform one or more of operations:

providing, via the electrical power module 20445 of the active electronic key 2001, electrical power supply through an active electronic key power supply port 20161 to the electronic lock 100, and providing the active digital key to the electronic lock 100 through an active communication channel 20151 of the active electronic key 2001, when the first user inserts the active electronic key 2001 into an active electronic keyhole 1011 of the electronic lock 100;

providing, via the electrical power module 20445 of the active electronic key 2001, electrical power supply to the passive electronic key 2002 through a passive electronic key power supply port 20162 from the electronic lock 100, and providing the passive digital key to the electronic lock 100 through a passive communication channel 20152 of the passive electronic key 2002, when the active electronic key 2001 is inserted in the active electronic keyhole 1011 of the electronic lock 100, and a second user inserts the passive electronic key 2002 into a passive electronic keyhole 1012 of the electronic lock 100;

instructing, by the digital key control module 20442 of the active electronic key 2001 through the active communication channel 20151 of the active electronic key 2001, the electronic lock 100 to compare the active digital key received and the passive digital key received with a prestored active digital key and a prestored passive digital key in the digital key storage module 10441 of the electronic lock 100; and operating, by an electronic lock control module 10446 of the electronic lock 100, an electronic lock tongue 1003 through an electronic locking mechanism 106 to lock and unlock the electronic lock 100, when a digital key authentication module 10444 of the electronic lock 100 determines that the active digital key received and the passive digital key received are the same as a prestored active digital key and a prestored passive digital key respectively.

In certain embodiments, the electrical power source 206 includes at least one of a battery and a rechargeable battery. The rechargeable battery includes at least one of: a lead-acid rechargeable battery, a nickel cadmium (NiCd) rechargeable battery, a nickel metal hydride (NiMH) rechargeable battery, a lithium ion (Li-ion) rechargeable battery, and a lithium ion polymer (Li-ion polymer) rechargeable battery. In certain embodiments, the active electronic key 2001 includes an active electronic key charging port 2017, as shown in FIG. 2, FIG. 3, and FIG. 5, and the active electronic key charging port 2017 is used to charge the rechargeable battery.

In certain embodiments, the electronic lock 100 includes an electronic lock activation mechanism 108. In one embodiment, the electronic lock activation mechanism 108 is a push button on a side of the electronic lock 100. Prior to the activation, the electronic lock is locked. When the electronic lock 100 is ready for a new customer, the first user brings an active electronic key 2001 and a passive electronic key 2002 for the second user. When the first user inserts the active electronic key 2001 into the active electronic keyhole 1011 of the electronic lock 100, and the second user inserts the passive electronic key 2002 into the passive electronic keyhole 1012 of the electronic lock 100, the first user presses the push button, the digital key control module 10442 of the electronic lock 100 sends out digital key activation instructions to each of the active electronic key 2001 and the passive electronic key 2002 through communication channels 2015. In response to the digital key activation instructions received from the electronic lock 100, the active electronic key 2001 generates an active digital key and stores the active digital key generated in the digital key storage module 20441 of the active electronic key 2001, and the passive electronic key 2002 generates a passive digital key and stores the passive digital key generated in the digital key storage module 20441 of the passive electronic key 2002. At the end of activation process, the active digital key and the passive digital key are encrypted and transmitted to and stored the digital key storage module 10441 of the electronic lock 100 as the prestored active digital key and the prestored passive digital key for authentication of the set of electronic keys 200.

In certain embodiments, the electronic lock 100 includes at least two communication channels 2015. The communication channels 2015 includes at least the active communication channel 20151 for transmitting the active digital key between the active electronic key 2001 and the electronic lock 100 and transmitting active digital key control instructions to the electronic lock 100, and at least the passive communication channel 20152 for transmitting the passive digital key between the passive electronic key 2002 and the electronic lock 100.

Figure 8:
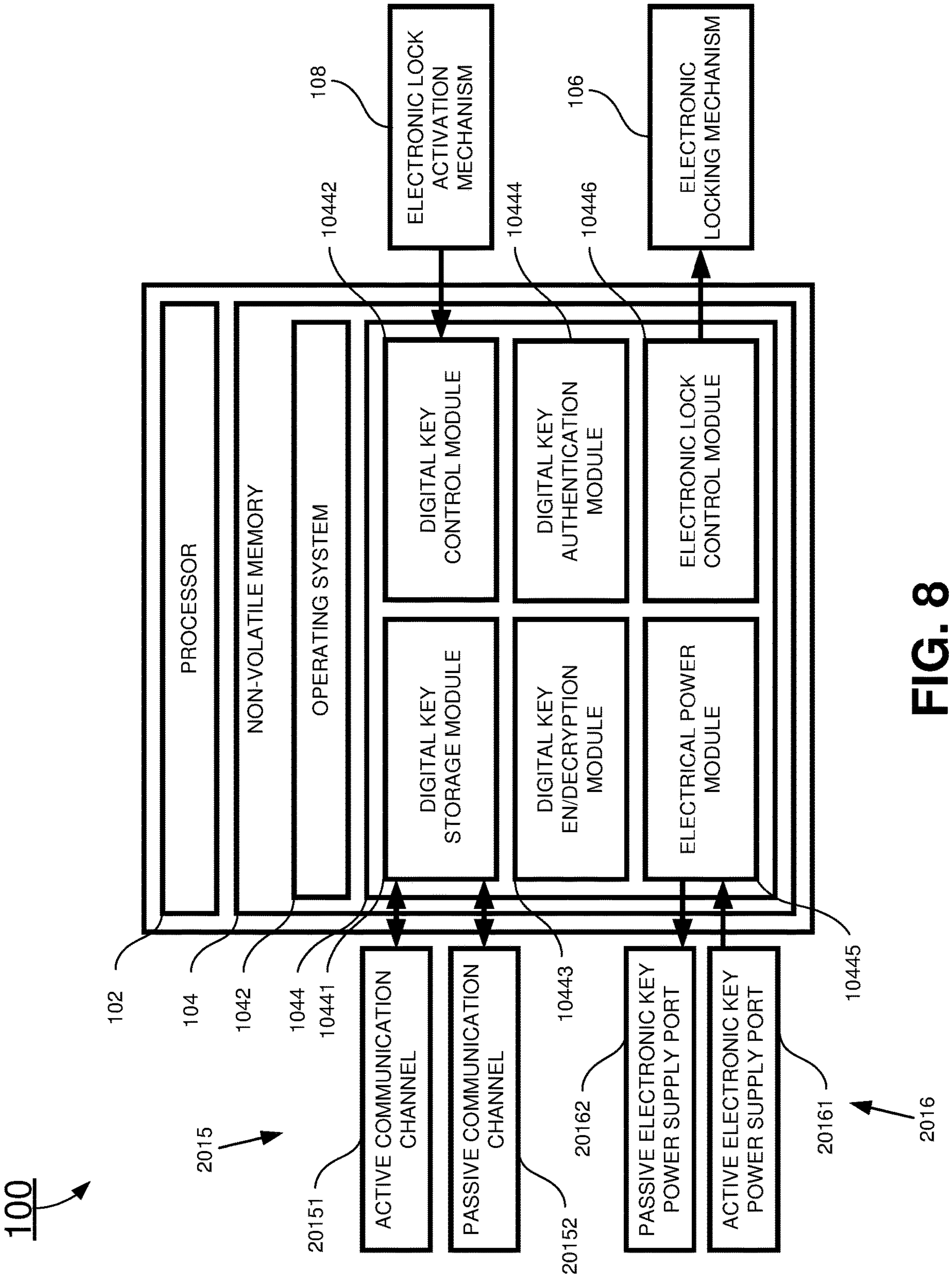
FIG. 8 is a block diagram of an exemplary electronic lock according to certain embodiments of the present disclosure.

In certain embodiments, as shown in FIG. 8, the electronic lock 100 includes at least two electronic key power supply ports 2016. The electronic key power supply ports 2016 includes at least the active electronic key power supply port 20161 for receiving electrical power supply from the active electronic key 2001, and at least the passive electronic key power supply port 20162 for providing electrical power supply to the passive electronic key 2002 from the active electronic key 2001 through the electronic lock 100.

Figure 7:
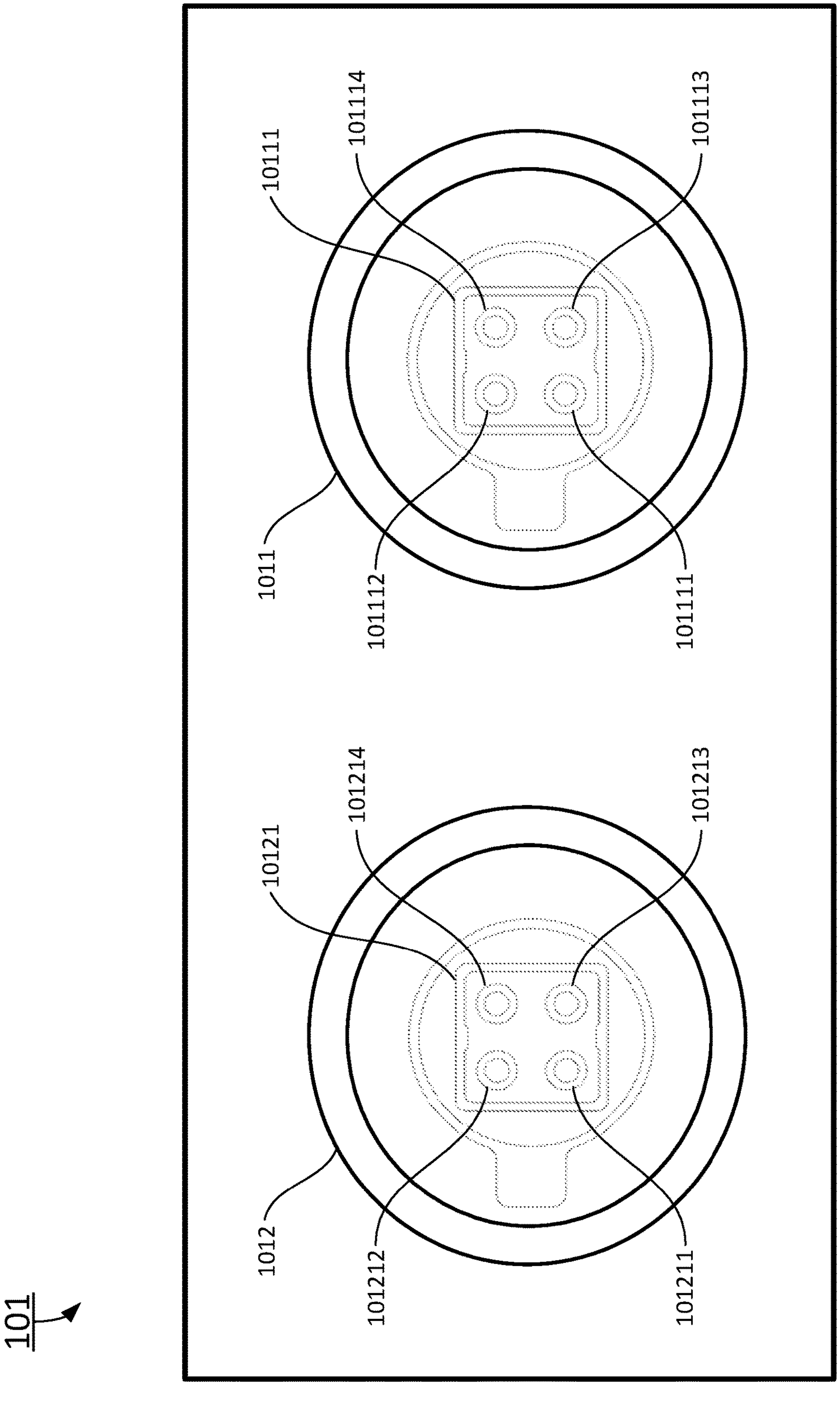
FIG. 7 shows exemplary sets of electronic key contacts of electronic keyholes of the electronic lock according to certain embodiments of the present disclosure.

In certain embodiments, the electronic lock 100 includes two or more electronic keyholes 101. When the electronic lock 100 has three electronic keyholes, the electronic lock 100 can be locked and unlocked by three authorized people, one with an active electronic key, two with passive electronic keys. When the electronic lock 100 has two electronic keyholes, the electronic lock 100 can be locked and unlocked by two authorized people, one with an active electronic key 2001 and another one with passive electronic key 2002. As shown in FIG. 7, the electronic keyholes 101 include at least one active electronic keyhole 1011 and at least one passive electronic keyhole 1012. The active electronic keyhole 1011 includes at least two active electronic keyhole contacts 10111 and the active electronic keyhole 1011 receives the active electronic key 2001. The passive electronic keyhole 1012 includes at least two passive electronic keyhole contacts 10121 and the passive electronic keyhole 1012 receives the passive electronic key 2002.

In one embodiment, the active electronic keyhole 1011 has two active electronic keyhole contacts 10111: a first contact of the active electronic keyhole 101111, and a second contact of the active electronic keyhole 101112. The passive electronic keyhole 1012 has two passive electronic keyhole contacts 10121: a first contact of the passive electronic keyhole 101211, and a second contact of the passive electronic keyhole 101212. In certain embodiments, the first contact 101111 and the second contact 101112 of the active electronic keyhole 1011 form the active electronic key power supply port 20161, and these two contacts can be shared to form the active communication channel 20151. The first contact 101211 and the second contact 101212 of the passive electronic keyhole 1012 form the passive electronic key power supply port 20162, and these two contacts can be shared to form the passive communication channel 20152.

In another embodiment, the active electronic keyhole 1011 has three active electronic keyhole contacts 10111: a first contact of the active electronic keyhole 101111, a second contact of the active electronic keyhole 101112, and a third contact of the active electronic keyhole 101113. The passive electronic keyhole 1012 has three passive electronic keyhole contacts 10121: a first contact of the passive electronic keyhole 101211, a second contact of the passive electronic keyhole 101212, and a third contact of the passive electronic keyhole 101213. In certain embodiments, the first contact 101111 and the second contact 101112 of the active electronic keyhole 1011 form the active electronic key power supply port 20161, and the second contact 101112 (common contact) and the third contact 101113 form the active communication channel 20151. The first contact 101211 and the second contact 101212 of the passive electronic keyhole 1012 form the passive electronic key power supply port 20162, and the second contact 101212 (common contact) and the third contact 101213 form the passive communication channel 20152.

In certain embodiments, as shown in FIG. 7, the active electronic keyhole 1011 has four active electronic keyhole contacts 10111: a first contact of the active electronic keyhole 101111, a second contact of the active electronic keyhole 101112, a third contact of the active electronic keyhole 101113, and a fourth contact of the active electronic keyhole 101114. In certain embodiments, the first contact 101111 and the second contact 101112 of the active electronic keyhole 1011 form the active electronic key power supply port 20161, and the third contact 101113 and the fourth contact 101114 form the active communication channel 20151.

In certain embodiments, as shown in FIG. 7, the passive electronic keyhole 1012 has four passive electronic keyhole contacts 10121: a first contact of the passive electronic keyhole 101211, a second contact of the passive electronic keyhole 101112, a third contact of the passive electronic keyhole 101113, and a fourth contact of the passive electronic keyhole 101114. The first contact 101211 and the second contact 101212 of the passive electronic keyhole 1012 form the passive electronic key power supply port 20162, and the third contact 101213 and the fourth contact 101214 form the passive communication channel 20152.

When the active electronic key 2001 and the passive electronic key 2002 are inserted into corresponding active electronic keyhole 1011 and passive electronic keyhole 1012, respectively, these four active electronic keyhole contacts 10111 and four passive electronic keyhole contacts 10121 are connected to four corresponding electronic key contacts 201: the electronic key first contact 2011, the electronic key second contact 2012, the electronic key third contact 2013, and the electronic key fourth contact 2014, respectively. In this embodiment, the electronic key first contact 2011 and the electronic key second contact 2012 may be used for electrical power supply, and the electronic key third contact 2013 and the electronic key fourth contact 2014 may be used as communication channel.

The electronic lock 100 receives electrical power supply through the active electronic key power supply port 20161. The electronic lock 100 provides electrical power supply through the passive electronic key power supply port 20162 to the passive electronic key 2002. The electronic lock 100 receives the active digital key through the active communication channel 20151, and the passive digital key through the passive communication channel 20152.

The electronic lock 100 includes an electronic locking mechanism 106 controlled by an electronic lock control module 10446. Once the digital key authentication module 10444 determines that the active digital key received from the active electronic key 2001 and the passive digital key received from the passive electronic key 2002 match the prestored active digital key and the prestored passive digital key stored in the digital key storage module 10441, the electronic lock control module 10446 sends out electronic locking control instructions to lock and unlock the electronic lock 100. The electronic locking mechanism 106 includes the electronic lock tongue 1003. The electronic lock tongue 1003 is in retracted state when the electronic lock 100 is unlocked, and the electronic lock tongue 1003 is in extended state when the electronic lock 100 is locked.

In certain embodiments, when the electronic lock 100 is used for a safe deposit box in a bank, the first user may be a bank employee managing the electronic lock 100 and uses the active electronic key 2001. The second user may be a customer renting the safe deposit box and uses the passive electronic key 2002. The electronic lock 100 is to be locked and unlocked only when the first user and the second user are both present and use their own respective electronic keys simultaneously.

In yet another aspect, the present disclosure relates to a method of using a set of electronic keys 200 to operate an electronic lock 100.

In certain embodiments, as shown in FIG. 1, an electronic locking system 10 includes an electronic lock 100, and a set of electronic keys 200. The set of electronic keys 200 includes N electronic keys: a first electronic key 2001, a second electronic key 2002, . . . , and an N-th electronic key 200N. When the electronic lock 100 is equipped with N keyholes, all N electronic keys are required to lock and unlock the electronic lock 100. In one embodiment, as shown in FIG. 2, the electronic locking system 10 includes the electronic lock 100, and two electronic keys: an active electronic key 2001 and a passive electronic key 2002. In this case, both active electronic key 2001 and passive electronic key 2002 are required to lock and unlock the electronic lock 100, as shown in FIG. 3.

In certain embodiments, the method includes:

inserting, by a first user, an active electronic key 2001 into an active electronic keyhole 1011 of the electronic lock 100, wherein the active electronic key 2001 comprises an electrical power source 206 to provide electrical power supply to the electronic lock 100 through an active electronic key power supply port 20161 of the active electronic key 2001, and an active digital key to the electronic lock 100 through an active communication channel 20151 of the active electronic key 2001;

inserting, by a second user while the active electronic key 2001 is inserted in the active electronic keyhole 1011 of the electronic lock 100, a passive electronic key 2002 into a passive electronic keyhole 1012 of the electronic lock 100 to receive electrical power supply from the electronic lock 100 through an electrical power module 20445 of the passive electronic key 2002 and a passive electronic key power supply port 20162 from the electronic lock 100, and to provide a passive digital key to the electronic lock 100 through a passive communication channel 20152 of the passive electronic key 2002;

instructing, by the digital key control module 20442 of the active electronic key 2001 through the active communication channel 20151 of the active electronic key 2001, the electronic lock 100 to compare the active digital key received and the passive digital key received with a prestored active digital key and a prestored passive digital key in the digital key storage module 10441 of the electronic lock 100; and operating, by an electronic lock control module 10446 of the electronic lock 100, an electronic lock tongue 1003 through an electronic locking mechanism 106 to lock and unlock the electronic lock 100, when a digital key authentication module 10444 of the electronic lock 100 determines that the active digital key received and the passive digital key received are the same as a prestored active digital key and a prestored passive digital key respectively.

In certain embodiments, each of the set of electronic keys 200 includes: an electronic key processor 202, and a non-volatile memory 204. The non-volatile memory 204 stores an operating system 2042 and computer executable instructions 2044. The computer executable instructions 2044 include: a digital key storage module 20441, the digital key control module 20442, a digital key encryption/decryption module 20443, and the electrical power module 20445.

In certain embodiments, during an activation process of the electronic lock 100, the first user triggers an electronic lock activation mechanism 108, a digital key control module 10442 of the electronic lock sends an activation instruction to the active electronic key 2001 and the passive electronic key 2002 through an active communication channel 20151 and a passive communication channel 20152 respectively, the activation instruction instructs the digital key control module 20442 of the active electronic key 2001 to generate an active digital key for the active electronic key 2001 and the digital key control module 20442 of the passive electronic key 2002 to generate a passive digital key for the passive electronic key 2002, the active digital key generated is stored in a digital key storage module 20441 of the active electronic key 2001, the passive digital key generated is stored in a digital key storage module 20441 of the passive electronic key 2002, the active digital key generated is encrypted by a digital key en/decryption module 20443 of the active electronic key 2001 and transmitted to the electronic lock digital key storage module 10441 as a prestored active digital key, the passive digital key generated is encrypted by a digital key en/decryption module 20443 of the passive electronic key 2002 and transmitted to the electronic lock digital key storage module 10441 as a prestored passive digital key, and the prestored active digital key and the prestored passive digital key are used for authentication of the set of electronic keys 200.

In certain embodiments, the digital key storage module 20441 of the active electronic key 2001 receives and stores the active digital key from the digital key control module 20442 of the active electronic key 2001. The digital key storage module 20441 of the passive electronic key 2002 receives and stores the passive digital key from the digital key control module 20442 of the passive electronic key 2002.

In certain embodiments, the digital key encryption/decryption module 20443 of the active electronic key 2001 encrypts the active digital key before transmitting out. The digital key encryption/decryption module 20443 of the passive electronic key 2002 encrypts the passive digital key before transmitting out.

In certain embodiments, the electrical power module 20445 of the active electronic key 2001 receives electrical power supply from the electrical power source 206 and provides electrical power supply to the electronic lock 100, and the electrical power module 20445 of the passive electronic key 2002 receives electrical power supply from the active electronic key 2001 through the electronic lock 100.

In certain embodiments, the first user is a management staff of the electronic lock 100 and uses the active electronic key 2001. The second user is a customer and uses the passive electronic key 2002. The electronic lock 100 is to be locked and unlocked only when the first user and the second user are both present and use their own respective electronic keys simultaneously.

In certain embodiments, the electronic lock 100 includes two or more electronic keyholes 101. These electronic keyholes 101 include at least the active electronic keyhole 1011 and at least the passive electronic keyhole 1012. The active electronic keyhole 1011 includes at least two active electronic keyhole contacts 10111 and the active electronic keyhole 1011 receives the active electronic key 2001. The passive electronic keyhole 1012 includes at least two passive electronic keyhole contacts 10121 and the passive electronic keyhole 1012 receives the passive electronic key 2002.

In certain embodiments, the electronic lock 100 includes at least two communication channels 2015. The communication channels 2015 includes at least the active communication channel 20151 for transmitting the active digital key between the active electronic key 2001 and the electronic lock 100 and transmitting active digital key control instructions to the electronic lock 100, and at least the passive communication channel 20152 for transmitting the passive digital key between the passive electronic key 2002 and the electronic lock 100.

In certain embodiments, the electronic lock 100 includes at least two electronic key power supply ports 2016. The electronic key power supply ports 2016 includes at least the active electronic key power supply port 20161 for receiving electrical power supply from the active electronic key 2001, and at least the passive electronic key power supply port 20162 for providing electrical power supply to the passive electronic key 2002 from the active electronic key 2001 through the electronic lock 100.

In certain embodiments, the electrical power source 206 includes at least one of a battery and a rechargeable battery. The rechargeable battery includes at least one of: a lead-acid rechargeable battery, a nickel cadmium (NiCd) rechargeable battery, a nickel metal hydride (NiMH) rechargeable battery, a lithium ion (Li-ion) rechargeable battery, and a lithium ion polymer (Li-ion polymer) rechargeable battery. In certain embodiments, the active electronic key 2001 includes an active electronic key charging port 2017, and the active electronic key charging port 2017 is used to charge the rechargeable battery.

Figure 9:
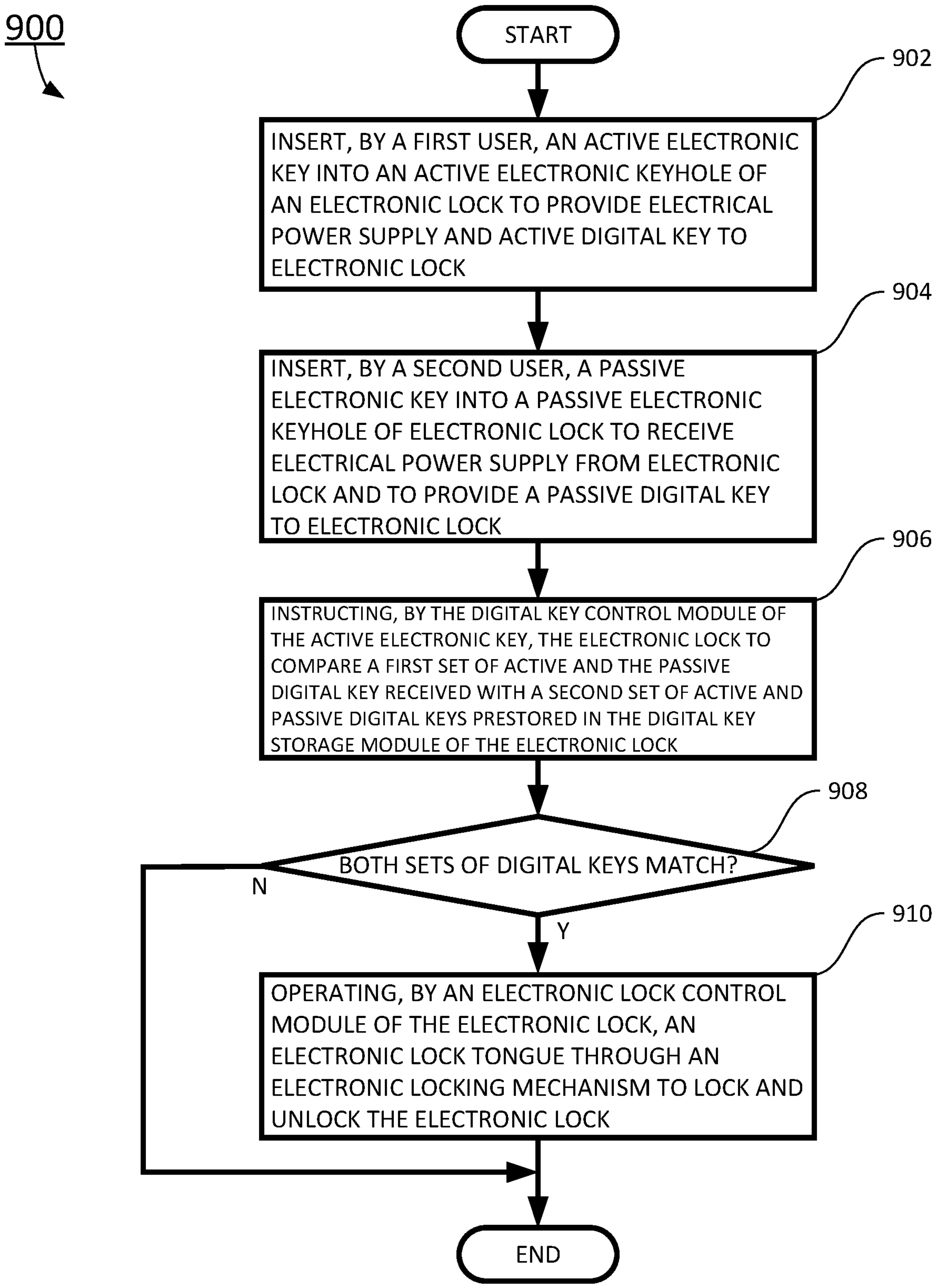
FIG. 9 shows a flowchart of a method of using the electronic keys according to certain embodiments of the present disclosure.

Referring now to FIG. 9, a flowchart of the method 900 of using the set of electronic keys 200 to operate the electronic lock 100 is shown according to certain embodiments of the present disclosure.

At block 902, a first user inserts an active electronic key 2001 into an active electronic keyhole 1011 of the electronic lock 100. The active electronic key 2001 includes an electrical power source 206 to provide electrical power supply to the electronic lock 100 through an active electronic key power supply port 20161 of the active electronic key 2001. Additionally, the active electronic key 2001 provide an active digital key to the electronic lock 100 through an active communication channel 20151 of the active electronic key 2001. Since the active electronic key 2001 provides electrical power supply to the entire electronic locking system 10, the electronic locking system 10 will not function without the active electronic key 2001. Customarily, the first user is a bank employee who manages the safe deposit box where the electronic lock 100 is installed.

At block 904, while the active electronic key 2001 is still in the active electronic keyhole 1011 of the electronic lock 100, a second user inserts a passive electronic key 2002 into a passive electronic keyhole 1012 of the electronic lock 100 to receive electrical power supply from the electronic lock 100 through an electrical power module 20445 of the passive electronic key 2002 and a passive electronic key power supply port 20162 from the electronic lock 100, and to provide a passive digital key to the electronic lock 100 through a passive communication channel 20152 of the passive electronic key 2002. Since the passive electronic key 2002 does not have electrical power supply, the electronic locking system 10 will not function with only the passive electronic key 2002. Customarily, the second user is a customer who rents the safe deposit box where the electronic lock 100 is installed.

At block 906, once the active electronic key 2001 and the passive electronic key 2002 are inserted into the active electronic keyhole 1011 and passive electronic keyhole 1012 of the electronic lock 100 respectively, the active electronic key 2001, the passive electronic key 2002, and the electronic key 100 are all powered up by the electrical power source 206 of the active electronic key 2001, a digital key control module 20442 of the active electronic key 2001 sends out active digital key control instructions to the electronic lock 100 through the active communication channel 20151 of the active electronic key 2001 to compare the active digital key received and the passive digital key received (a first set of digital keys) with a prestored active digital key and a prestored passive digital key (a second set of digital keys) in the digital key storage module 10441 of the electronic lock 100.

At query block 908, while both active electronic key 2001 and passive electronic key 2002 are inserted into the active electronic keyhole 1011 and passive electronic keyhole 1012 of the electronic lock 100 respectively, the digital key control module 20442 of the active electronic key 2001 sends out active digital key control instructions to the electronic lock 100 through the active communication channel 20151 of the active electronic key 2001 to a digital key authentication module 10444 of the electronic lock 100 to determine whether the first set of digital keys (the active and passive digital keys received) matches the second set of digital keys (the prestored active and passive digital keys). When the first set of digital keys matches the second set of digital keys respectively, the method proceeds to block 910. Otherwise, the method ends.

At block 910, when the digital key authentication module 10444 of the electronic lock 100 determines that the first set of digital keys matches the second set of digital keys respectively, the electronic lock control module 10446 of the electronic lock 100 operates the electronic lock tongue 1003 through the electronic locking mechanism 106 to lock and unlock the electronic lock 100. The electronic lock tongue 1003 is in retracted state when the electronic lock 100 is unlocked, and the electronic lock tongue 1003 is in extended state when the electronic lock 100 is locked.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A set of electronic keys for an electronic lock, comprising:

at least one passive electronic key, wherein the passive electronic key comprises a plurality of electronic key contacts;

at least one active electronic key, wherein the active electronic key comprises a plurality of electronic key contacts and an electrical power source, wherein the electronic lock comprises a digital key storage module, a digital key control module, a digital key en/decryption module, a digital key authentication module, an electrical power module, and an electronic lock control module, and the electrical power source of the active electronic key provides electrical power supply to the active electronic key, the electronic lock and the passive electronic key through the electronic lock to operate the electronic lock.

2. The set of electronic keys according to claim 1, wherein each of the active electronic key and the passive electronic key comprises:

an electronic key processor, and a non-volatile memory, wherein the non-volatile memory stores an operating system and computer executable instructions, and the computer executable instructions include:

a digital key control module, wherein during an activation process of the electronic lock, a first user triggers an electronic lock activation mechanism, the digital key control module of the electronic lock sends an activation instruction to the active electronic key and the passive electronic key through an active communication channel and a passive communication channel respectively, the activation instruction instructs the digital key control module of the active electronic key to generate an active digital key for the active electronic key and the digital key control module of the passive electronic key to generate a passive digital key for the passive electronic key, the active digital key generated is stored in a digital key storage module of the active electronic key, the passive digital key generated is stored in a digital key storage module of the passive electronic key, the active digital key generated is encrypted by a digital key en/decryption module of the active electronic key and transmitted to the digital key storage module of the electronic lock as a prestored active digital key, the passive digital key generated is encrypted by a digital key en/decryption module of the passive electronic key and transmitted to the digital key storage module of the electronic lock as a prestored passive digital key, and the prestored active digital key and the prestored passive digital key are used for authentication of the set of electronic keys;

the digital key storage module, wherein the digital key storage module of the active electronic key receives and stores the active digital key from the digital key control module of the active electronic key, and the digital key storage module of the passive electronic key receives and stores the passive digital key from the digital key control module of the passive electronic key;

the digital key en/decryption module, wherein the digital key en/decryption module of the active electronic key encrypts the active digital key before transmitting out, and the digital key en/decryption module of the passive electronic key encrypts the passive digital key before transmitting out; and an electrical power module, wherein the electrical power module of the active electronic key receives electrical power supply from the electrical power source and provides electrical power supply to the electronic lock, and the electrical power module of the passive electronic key receives electrical power supply from the active electronic key through the electronic lock.

3. The set of electronic keys according to claim 2, wherein when executed by the electronic key processor, the computer executable instructions cause the electronic key processor to perform one or more of operations:

providing, via the electrical power module of the active electronic key, electrical power supply through an active electronic key power supply port to the electronic lock, and providing an active digital key to the electronic lock through the active communication channel of the active electronic key, when the first user inserts the active electronic key into an active electronic keyhole of the electronic lock;

providing, via the electrical power module of the active electronic key, electrical power supply to the passive electronic key through a passive electronic key power supply port from the electronic lock, and providing the passive digital key to the electronic lock through the passive communication channel of the passive electronic key, when the active electronic key is inserted in the active electronic keyhole of the electronic lock, and a second user inserts the passive electronic key into a passive electronic keyhole of the electronic lock;

instructing, by the digital key control module of the active electronic key through the active communication channel of the active electronic key, the electronic lock to compare the active digital key received and the passive digital key received with a prestored active digital key and a prestored passive digital key in the digital key storage module of the electronic lock; and operating, by an electronic lock control module of the electronic lock, an electronic lock tongue through an electronic locking mechanism to lock and unlock the electronic lock, when a digital key authentication module of the electronic lock determines that the active digital key received and the passive digital key received are the same as a prestored active digital key and a prestored passive digital key respectively.

4. The set of electronic keys according to claim 3, wherein the electronic lock comprises a plurality of electronic keyholes, wherein the plurality of electronic keyholes comprises at least the active electronic keyhole and at least a passive electronic keyhole, wherein the active electronic keyhole comprises at least two active electronic keyhole contacts and the active electronic keyhole receives the active electronic key, and the passive electronic keyhole comprises at least two passive electronic keyhole contacts and the passive electronic keyhole receives the passive electronic key.

5. The set of electronic keys according to claim 3, wherein the first user is a management staff of the electronic lock and uses the active electronic key, the second user is a customer and uses the passive electronic key, and the electronic lock is to be locked and unlocked only when the first user and the second user are both present and use their own respective electronic keys simultaneously.

6. The set of electronic keys according to claim 3, wherein the electronic lock comprises a plurality of communication channels, wherein the plurality of communication channels comprises at least the active communication channel for transmitting the active digital key between the active electronic key and the electronic lock and transmitting active digital key control instructions to the electronic lock, and at least the passive communication channel for transmitting the passive digital key between the passive electronic key and the electronic lock.

7. The set of electronic keys according to claim 3, wherein the electronic lock comprises a plurality of electronic key power supply ports, wherein the plurality of electronic key power supply ports comprises at least the active electronic key power supply port for receiving electrical power supply from the active electronic key, and at least the passive electronic key power supply port for providing electrical power supply to the passive electronic key from the active electronic key through the electronic lock.

8. The set of electronic keys according to claim 1, wherein the electrical power source comprises at least one of a battery and a rechargeable battery.

9. The set of electronic keys according to claim 8, wherein the rechargeable battery comprises at least one of:
- a lead-acid rechargeable battery;
- a nickel cadmium (NiCd) rechargeable battery;
- a nickel metal hydride (NiMH) rechargeable battery;
- a lithium ion (Li-ion) rechargeable battery; and
- a lithium ion polymer (Li-ion polymer) rechargeable battery.

10. The set of electronic keys according to claim 8, wherein the active electronic key comprises an active electronic key charging port, wherein the active electronic key charging port is used to charge the rechargeable battery.

11. A method of using a set of electronic keys to operate an electronic lock, comprising:
- inserting, by a first user, an active electronic key into an active electronic keyhole of the electronic lock, wherein the active electronic key comprises an electrical power source to provide electrical power supply to the electronic lock through an active electronic key power supply port of the active electronic key, and an active digital key to the electronic lock through an active communication channel of the active electronic key, wherein the active electronic key comprises a digital key storage module, a digital key control module, a digital key en/decryption module, and an electrical power module;
- inserting, by a second user while the active electronic key is inserted in the active electronic keyhole of the electronic lock, a passive electronic key into a passive electronic keyhole of the electronic lock to receive electrical power supply from the electronic lock through an electrical power module of the passive electronic key and a passive electronic key power supply port from the electronic lock, and to provide a passive digital key to the electronic lock through a passive communication channel of the passive electronic key, wherein the passive electronic key comprises a digital key storage module, a digital key control module, a digital key en/decryption module, and an electrical power module;
- instructing, by the digital key control module of the active electronic key through the active communication channel of the active electronic key, the electronic lock to compare the active digital key received and the passive digital key received with a prestored active digital key and a prestored passive digital key in a digital key storage module of the electronic lock, wherein the electronic lock comprises the digital key storage module, a digital key control module, a digital key en/decryption module, a digital key authentication module, an electrical power module, and an electronic lock control module; and
- operating, by an electronic lock control module of the electronic lock, an electronic lock tongue through an electronic locking mechanism to lock and unlock the electronic lock, when a digital key authentication module of the electronic lock determines that the active digital key received and the passive digital key received are the same as a prestored active digital key and a prestored passive digital key respectively.

12. The method according to claim 11, wherein each of the active electronic key and the passive electronic key comprises:
- an electronic key processor, and a non-volatile memory, wherein the non-volatile memory stores an operating system and computer executable instructions, and the computer executable instructions include:
  - the digital key control module, wherein during an activation process of the electronic lock, the first user triggers an electronic lock activation mechanism, a digital key control module of the electronic lock sends an activation instruction to the active electronic key and the passive electronic key through an active communication channel and a passive communication channel respectively, the activation instruction instructs the digital key control module of the active electronic key to generate an active digital key for the active electronic key and the digital key control module of the passive electronic key to generate a passive digital key for the passive electronic key, the active digital key generated is stored in a digital key storage module of the active electronic key, the passive digital key generated is stored in a digital key storage module of the passive electronic key, the active digital key generated is encrypted by a digital key en/decryption module of the active electronic key and transmitted to the digital key storage module of the electronic lock as a prestored active digital key, the passive digital key generated is encrypted by a digital key en/decryption module of the passive electronic key and transmitted to the digital key storage module of the electronic lock as a prestored passive digital key, and the prestored active digital key and the prestored passive digital key are used for authentication of the set of electronic keys;
  - the digital key storage module, wherein the digital key storage module of the active electronic key receives and stores the active digital key from the digital key control module of the active electronic key, and the digital key storage module of the passive electronic key receives and stores the passive digital key from the digital key control module of the passive electronic key;

the digital key en/decryption module, wherein the digital key en/decryption module of the active electronic key encrypts the active digital key before transmitting out, and the digital key en/decryption module of the passive electronic key encrypts the passive digital key before transmitting out; and the electrical power module, wherein the electrical power module of the active electronic key receives electrical power supply from the electrical power source and provides electrical power supply to the electronic lock, and the electrical power module of the passive electronic key receives electrical power supply from the active electronic key through the electronic lock.

13. The method according to claim 11, wherein the first user is a management staff of the electronic lock and uses the active electronic key, the second user is a customer and uses the passive electronic key, and the electronic lock is to be locked and unlocked only when the first user and the second user are both present and use their own respective electronic keys simultaneously.

14. The method according to claim 11, wherein the electronic lock comprises a plurality of communication channels, wherein the plurality of communication channels comprises at least the active communication channel for transmitting the active digital key between the active electronic key and the electronic lock and transmitting active digital key control instructions to the electronic lock, and at least the passive communication channel for transmitting the passive digital key between the passive electronic key and the electronic lock.

15. The method according to claim 11, wherein the electronic lock comprises a plurality of electronic key power supply ports, wherein the plurality of electronic key power supply ports comprises at least the active electronic key power supply port for receiving electrical power supply from the active electronic key, and at least the passive electronic key power supply port for providing electrical power supply to the passive electronic key from the active electronic key through the electronic lock.

16. The method according to claim 11, wherein the electronic lock comprises a plurality of electronic keyholes, wherein the plurality of electronic keyholes comprises at least the active electronic keyhole and at least the passive electronic keyhole.

17. The method according to claim 16, wherein the active electronic keyhole comprises at least two active electronic keyhole contacts and the active electronic keyhole receives the active electronic key, and the passive electronic keyhole comprises at least two passive electronic keyhole contacts and the passive electronic keyhole receives the passive electronic key.

18. The method according to claim 11, wherein the electrical power source comprises at least one of a battery and a rechargeable battery.

19. The method according to claim 18, wherein the rechargeable battery comprises at least one of:

a lead-acid rechargeable battery;

a nickel cadmium (NiCd) rechargeable battery;

a nickel metal hydride (NiMH) rechargeable battery;

a lithium ion (Li-ion) rechargeable battery; and a lithium ion polymer (Li-ion polymer) rechargeable battery.

20. The method according to claim 18, wherein the active electronic key comprises an active electronic key charging port, wherein the active electronic key charging port is used to charge the rechargeable battery.

* * * * *